(12) United States Patent
Jackson et al.

(10) Patent No.: US 6,532,062 B2
(45) Date of Patent: Mar. 11, 2003

(54) METHOD AND APPARATUS FOR MEASURING VEHICLE WHEEL SCRUB RADIUS

(75) Inventors: David A. Jackson, Point Roberts, WA (US); Stephen L. Glickman, Los Gatos, CA (US); James L. Dale, Jr., Conway, AR (US); Donald A. Healy, Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/892,722

(22) Filed: Jun. 28, 2001

(65) Prior Publication Data

US 2002/0001076 A1 Jan. 3, 2002

Related U.S. Application Data

(60) Provisional application No. 60/214,390, filed on Jun. 28, 2000.

(51) Int. Cl.[7] ................ G01B 11/26; G01B 13/195; G01C 15/00
(52) U.S. Cl. ................ 356/139.09; 33/286; 33/203.18
(58) Field of Search ............... 356/139.09; 33/286, 33/203.18

(56) References Cited

U.S. PATENT DOCUMENTS

| | | | |
|---|---|---|---|
| 4,479,382 A | 10/1984 | Greenhorn et al. | 73/146 |
| 5,090,235 A | 2/1992 | Hirano et al. | 73/117 |
| 5,291,660 A | 3/1994 | Koerner | 33/203.12 |
| 5,488,472 A * | 1/1996 | January | 356/139.09 |
| 5,969,246 A | 10/1999 | Jackson et al. | 73/459 |

FOREIGN PATENT DOCUMENTS

| | | | |
|---|---|---|---|
| DE | 2650577 | 4/1976 | 5/255 |
| DE | 19634505 | 8/1996 | 21/24 |
| FR | 0971205 | 2/1999 | 11/275 |
| WO | WO 93/07443 | 4/1993 | |
| WO | WO 98/48241 | 10/1998 | |

* cited by examiner

Primary Examiner—Stephen C. Buczinski
(74) Attorney, Agent, or Firm—McDermott, Will & Emery

(57) ABSTRACT

An apparatus and method for measuring a scrub radius of a wheel including determining at least one of a steering axis, a centerline and a ground plane of the wheel using computer-aided alignment, and determining the other of the steering axis, the centerline and the ground plane of the wheel not determined using computer-aided alignment. The method also includes determining an intersection between the steering axis and the ground plane of the wheel, determining an intersection between the centerline and the ground plane of the wheel, and determining a distance between the intersections, the distance being equal to the scrub radius of the wheel.

29 Claims, 10 Drawing Sheets

Distance Traveled

METHOD AND APPARATUS FOR MEASURING VEHICLE WHEEL SCRUB RADIUS

CROSS-REFERENCE TO RELATED APPLICATION

The present application claims priority from provisional U.S. patent application Ser. No. 60/214,390, filed Jun. 28, 2000, which is incorporated herein by reference in its entirety.

FIELD OF THE DISCLOSURE

The present disclosure generally relates to motor vehicle maintenance equipment and methods and, more specifically, to apparatus and methods for measuring a scrub radius of a motor vehicle.

BACKGROUND OF THE DISCLOSURE

Motor vehicle alignment systems are important for ensuring that the alignments of wheels on a vehicle are within the specifications provided by motor vehicle manufacturers. If the wheels are out of alignment, there may be excessive or uneven wear. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim".

The wheels of a motor vehicle may be aligned in a number of ways. For example, an operator or an alignment technician can use a vision imaging system such as a computer-aided, three-dimensional (3D) machine vision alignment system having optical sensing devices, such as cameras, to determine the positions of various objects. Although such machine vision systems are typically used for alignment purposes, these systems can also be used to obtain other positional and angular orientation information about a motor vehicle. Examples of alignment systems using at least one camera to image targets attached to the wheels of a vehicle are shown in U.S. Pat. Nos. 5,724,743 and 5,535,522.

Another type of alignment system uses head units which are attached to various wheels and interconnected by cables or cords. The angles of the head units, and thus the wheels, with respect to the cords are measured by an electromechanical transducer. Examples of this type of measurement device are shown in U.S. Pat. Nos. 4,016,208 and 4,034,479.

An additional type of alignment system uses head units which attach to various wheels and communicate with optical sensing. Examples of optical head unit systems are shown in U.S. Pat. Nos. 3,782,831, 3,892,042, 4,095,902, 4,126,943, 4,138,825, 4,143,970, 4,302,104 and 4,319,838.

The above-described position determination systems provide information, such as the centers of rotation of the vehicle's wheels, which aids in the wheel alignment of a vehicle. However, other information such as wheel scrub radius, can also aid a technician in diagnosing problems with the vehicle's suspension. A scrub radius is the distance between where the wheel's steering axis meets the ground and where the wheel's centerline meets the ground, as viewed from the front of the vehicle.

Being able to measure and confirm the scrub radius of a wheel is important since the scrub radius in combination with rolling friction, such as brake drag, bearing friction and tire rolling friction, can create a moment about the wheel's steering axis during straight ahead driving, causing the wheel to toe-out or toe-in (pivot on the steering axis). Vehicle manufacturers often specify an opposite toe-out or toe-in to compensate for the known vehicle parameters, including scrub radius. Since the scrub radius should remain fixed if the rims and tire of a vehicle are stock, a measured scrub radius that does not match up with a manufacturer's specified scrub radius can be an indication of damage to the vehicle suspension and steering system. In addition, if aftermarket tires of a different diameter, or rims of a different offset are added to the vehicle, the scrub radius will be altered. The toe of the wheels may be compensated for the different scrub radius to minimize tire wear.

Based on the foregoing, there is a clear need in this field for an apparatus and method for measuring the scrub radius of the wheels of a motor vehicle.

There is also a need for an apparatus and method that compares the measured scrub radius of the wheels of a vehicle and the specified scrub radius of the wheels.

There is an additional need for an apparatus and method that displays the results of wheel scrub radius measurements to aid an alignment technician with detecting damaged vehicle suspension or steering parts, and with detecting whether the wheels are of the correct specifications.

There is a further need for an apparatus and method that displays the results of wheel scrub radius measurements to aid an alignment technician with adjusting the toe of the wheel.

SUMMARY OF THE DISCLOSURE

The present disclosure accordingly provides a method of measuring a scrub radius of a wheel that includes using a computer-aided alignment apparatus to determine at least one of a steering axis, a centerline and a ground plane of the wheel. The other of the steering axis, the centerline and the ground plane of the wheel, if not determined using a computer-aided alignment apparatus, are then determined in other conventional manners. The method also includes determining an intersection between the steering axis and the ground plane of the wheel, determining an intersection between the centerline and the ground plane of the wheel, and determining a distance between the intersections, the distance being equal to the scrub radius of the wheel.

According to one aspect, each of the steering axis, the centerline, and the ground plane of the wheel are determined using a computer-aided alignment apparatus.

According to another aspect, the intersection between the steering axis and the ground plane, the intersection between the centerline and the ground plane, and the distance between the intersections are determined using a computer-aided alignment apparatus.

According to an additional aspect, the method includes determining a roll axis and a roll radius of the wheel, and determining the ground plane based on the roll axis and the roll radius.

According to a further aspect, the computer aided alignment apparatus comprises a computer-aided, three-dimensional machine vision apparatus including optical scanning devices and optically scannable targets. The method also includes attaching an optically scannable target to the wheel; optically scanning the target when the wheel is in a first position, and creating and storing values representing the first position; and optically scanning the target when the wheel is in a second position, and creating and storing values representing the second position.

According to an additional aspect, the method includes comparing the determined scrub radius to a specified scrub radius, and generating a warning if the determined scrub radius is not about equal to the specified scrub radius. According to a further aspect, the method includes calculating a new toe for the wheel if the determined scrub radius is not about equal to the specified scrub radius.

The present disclosure also provides an apparatus for measuring a scrub radius of a wheel. The apparatus includes a target fixedly attachable to the wheel, and a vision imager for detecting a first image of the target when the wheel is in a first position and for detecting a second image of the target when the wheel is in a second position. The apparatus also includes a data processor programmed to determine a scrub radius of the wheel based at least in part upon a comparison of the first image and the second image of the target.

The present disclosure further provides a computer-readable medium carrying one or more sequences of instructions which, when executed by at least one processor, cause the processor to detect a first image of a target fixed to a wheel in a first position, detect a second image of the target when the wheel is in a second position, and determine a scrub radius of the wheel based at least in part upon a comparison of the first image and the second image of the target.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF THE DISCLOSURE

Figure 1:
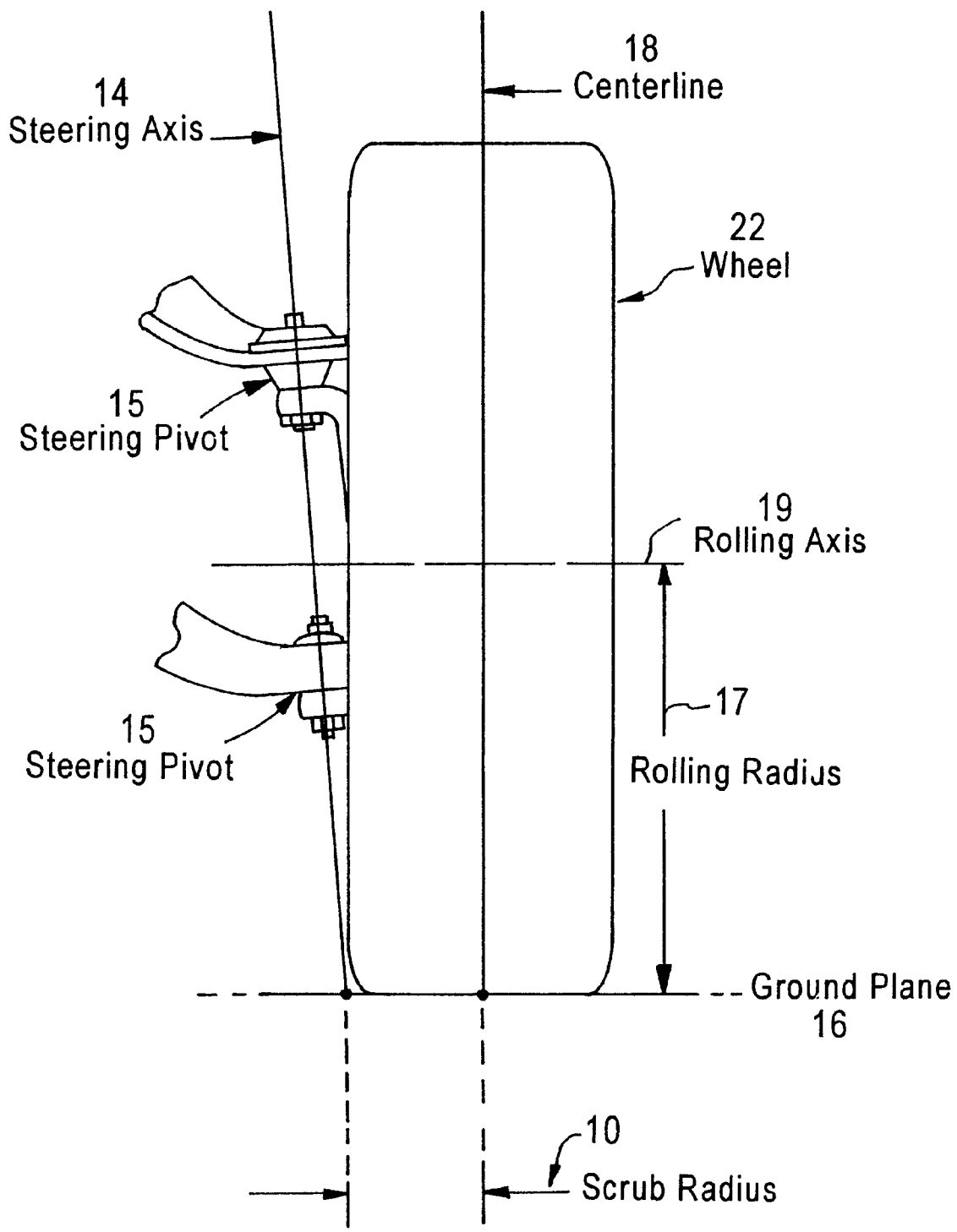
FIG. 1 is a front elevation view of a front wheel of a vehicle (e.g., an automobile having four wheels) showing alignment properties of the wheel, including a steering axis, a rotation axis, a roll radius and a scrub radius.
Figure 2:
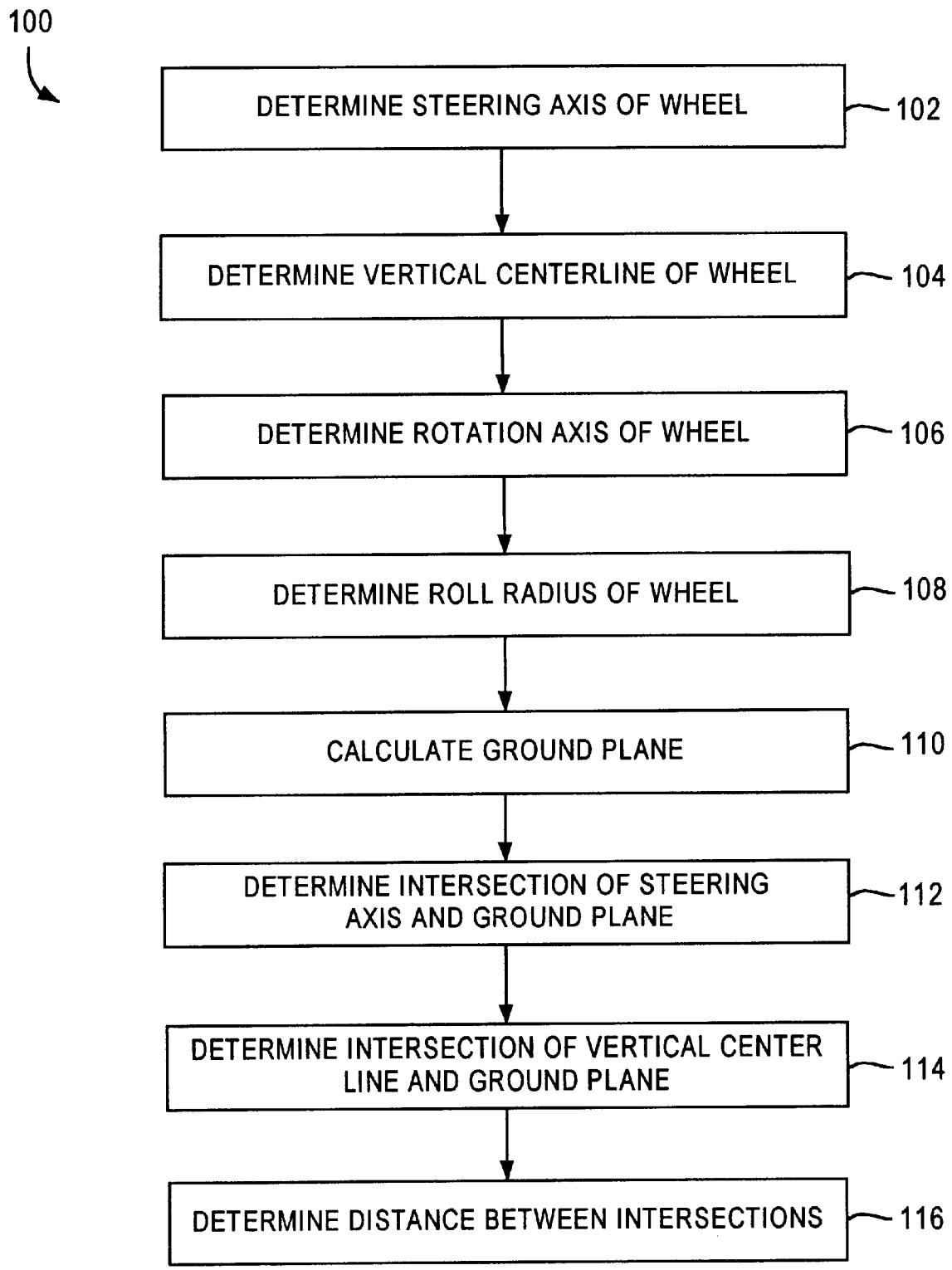
FIG. 2 is a flow chart illustrating a method according to the present disclosure for determining the scrub radius of a vehicle wheel.

Referring to FIGS. 1 and 2, the present disclosure provides a method 100 for determining a scrub radius 10 of a vehicle wheel 22. However, before the method of FIG. 2 is discussed, a description of the scrub radius 10 and other alignment measurements of a wheel 22 is provided.

Scrub Radius

As shown in FIG. 1, scrub radius 10 is the distance between where a steering axis 14 of the wheel 22 intersects a ground plane 16 of the wheel, and where a centerline 18 of the wheel intersects the ground plane 16, as viewed from the front of the vehicle. The scrub radius 10 shown in FIG. 1 is positive, but if the steering axis 14 intersects the ground plane 16 outside of the centerline 18, then the wheel will have a negative scrub radius.

The steering axis 14 passes through steering pivots 18 of the wheel 22 while the centerline 18 of the wheel can be determined as the midpoint of a width of the tire. A roll radius 17 of the wheel 22 is the distance between the ground plane and a central or roll axis 19 of the wheel.

Being able to measure and confirm the scrub radius 10 of the wheel 22 is important since the scrub radius can create a drag on the wheel during straight ahead driving, causing the wheel to toe-out or toe-in and pivot on the steering axis 14. As is known, if wheels on the same axle point straight ahead they have zero toe, while wheels that point towards each other have toe-in, and wheels that point away from each other have toe-out. Vehicle manufacturers often specify a slight amount of toe-in to compensate for a positive scrub radius 10, and a slight amount of toe-out to compensate for a negative scrub radius. Since the scrub radius 10 should remain fixed if the rims and tire of a vehicle are stock, a measured scrub radius that does not match up with a manufacturer's specified scrub radius can be an indication of damage to the vehicle suspension and steering system. In addition, if after market tires and rims or a different size tire or rim are added to the vehicle, the measured scrub radius can be used to adjust the toe of the wheels and compensate for the different tires. Thus, the present disclosure provides the method 100 of measuring the scrub radius 10 of the vehicle wheel 22.

Method of Measuring a Scrub Radius of a Vehicle Wheel

Referring also to FIG. 2, the method 100 includes first determining the steering axis 14 of the wheel 22 as shown at 102, and determining the centerline 18 of the wheel, as show at 104. Then, the location of the ground plane 16 is determined, as shown at 110, based upon the rotation or roll axis 19 and the roll radius 17 of the wheel 22 which are determined, respectively, as shown at 106 and 108. At 112 and 114 the intersection of the steering axis 14 and the ground plane 16 and the intersection of the centerline 18 and the ground plane 16 are determined. The scrub radius 10 is then determined by measuring the distance between the intersections, as shown at 116.

Figure 3:
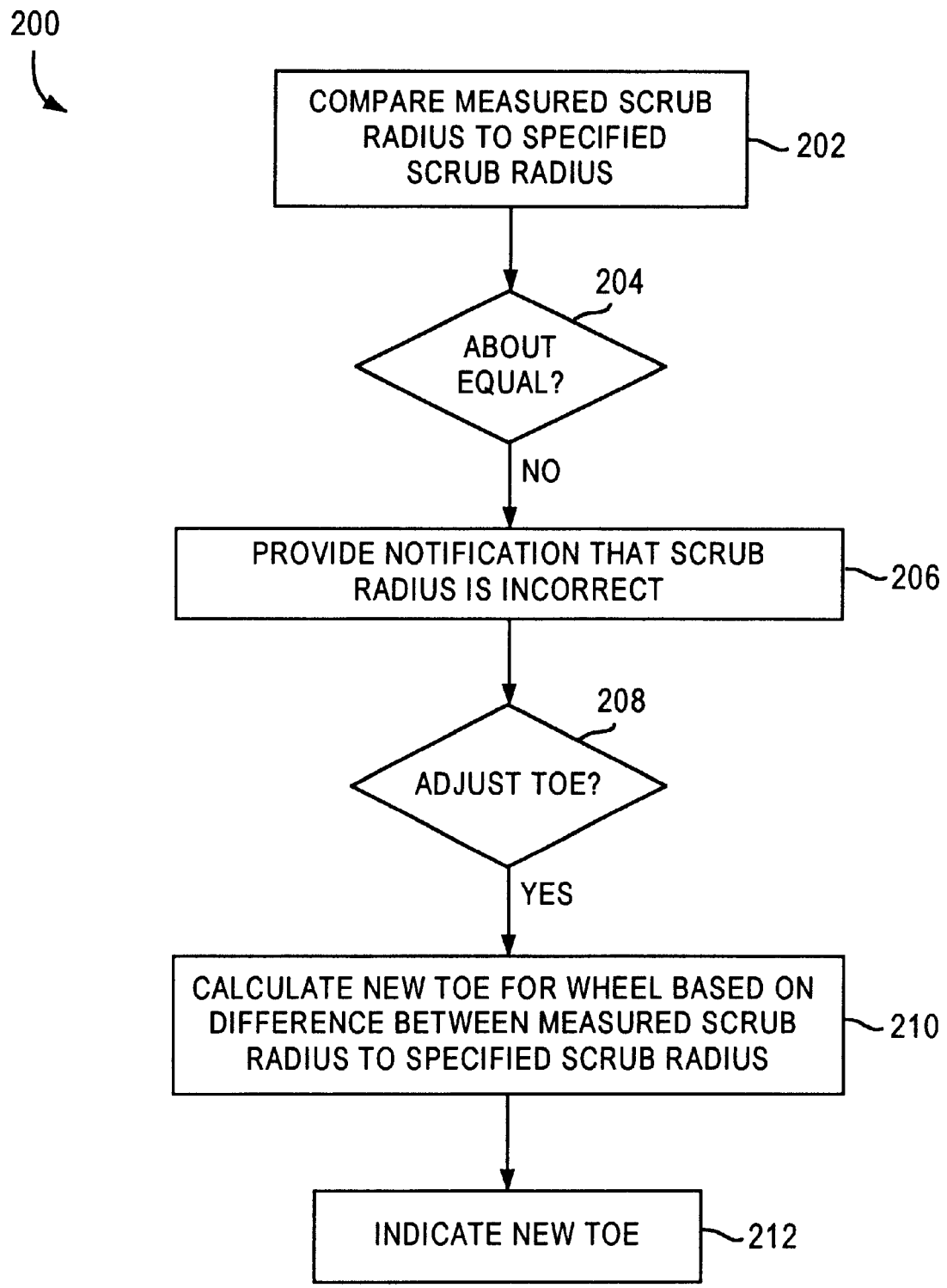
FIG. 3 is a flow chart illustrating a method according to the present disclosure for calculating a new toe for a vehicle wheel based upon the measured scrub radius of the wheel.

Referring to FIG. 3, a method 200 of using the measured scrub radius 10 is shown. The method 200 first includes comparing the measured scrub radius 10 to a specified scrub radius 10 for the particular vehicle, such as provided by the vehicle manufacturer. If the measured scrub radius 10 is not about equal (or within a predetermined tolerance of being equal) to the specified scrub radius 10, as shown at 204, then a notification is provided, as shown at 206, to an alignment technician for example. Then, if the alignment technician decides to adjust a toe of the wheel 22 to compensate for the incorrect scrub radius 10, as shown at 208, a new toe can be calculated, as shown at 210, and then indicated to the technician, as shown at 212. The correct toe adjustment is dependent in most cases on the particular type of vehicle and on specifications provided by the vehicle manufacturer.

Figure 4:
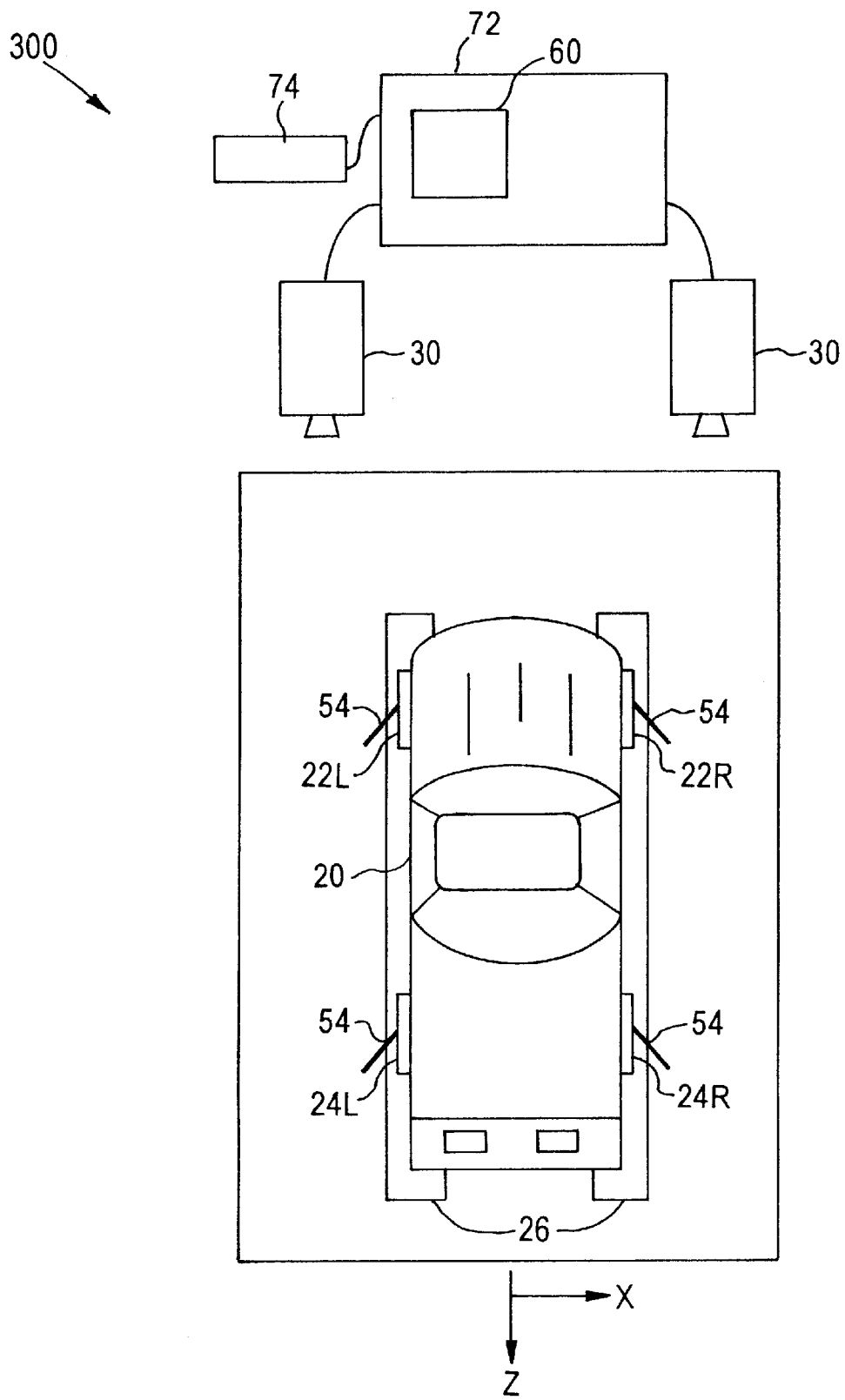
FIG. 4 is a perspective view of a computer-aided, three-dimensional (3D) machine vision alignment apparatus, which can be used for carrying out the methods of FIGS. 2 and 3.

Preferably, the methods 100, 200 of FIGS. 2 and 3 are conducted using a computer-aided, three-dimensional motor vehicle wheel alignment apparatus 300 ("alignment apparatus"), such as the type shown in FIG. 4. The Visualiner 3 D Gold™ Aligner, for example, is an alignment apparatus that can be used to determine the scrub radius of a vehicle in accordance with the present invention, and is available from the John Bean Company of Conway, Ark. (wwwjohnbean.com). Although, FIG. 4 shows a two-camera alignment apparatus 300, the presently disclosed methods 100, 200 are not meant to be limited to a particular wheel alignment apparatus, and can be carried out using other types of computer-aided alignment systems, such as a single-camera alignment apparatus or alignment systems using head units which attach to various wheels and communicate with cables or optical sensors.

Alignment Apparatus

FIG. 4 is a block diagram illustrating the alignment apparatus 300 for measuring and characterizing the scrub radius of front wheels 22L and 22R of a vehicle 20 in accordance with the present invention. As depicted, the vehicle 20, which also includes rear wheels 24L and 24R, is mounted on a vehicle supporting means that might include for example a lift rack 26. A target assembly 105 having a defined pattern or shape is affixed to each wheel of the vehicle 20.

The alignment apparatus 300 includes two optical sensing means 30 each having an interface to an electronic processing means 60. In the depicted embodiment, each of the optical sensing means 30 is a camera, and the processing means 60 is a computer system. The computer 60 preferably includes a visual display unit 72 and an operator interface or input means 74 such as a keyboard or remote input device. Computer-generated quasi-three-dimensional (3D) representation of the wheels being aligned may be depicted on the display unit 72 along with indicia of the detected alignment. In addition, the display unit 72 may depict hints or suggestions to guide the alignment technician who is performing the wheel alignment. The computer 60 also includes data storage means for storing predetermined automotive dynamic stability tolerance data.

Each of the optical sensors 30 can view at least one of the target assemblies 54 mounted on the wheels, and form an image thereof as viewed from the perspective of the sensing means. Electronic signals corresponding to the images are transferred to processing means 60 which correlates the detected perspective image of each target with the known true shape and orientation of reference data. In so doing, the computer 60 relates the perceived dimensions of certain known geometric elements on each target with the orientation and dimensions of corresponding reference data. In this manner, the alignment apparatus 300 can determine the position and attitude of each wheel 22L, 22R, 24L and 24R of the vehicle 20.

In a typical operation, the alignment apparatus 300 works generally as follows: vehicle 20 is positioned on alignment rack 26, which is raised to allow the alignment technician to perform the alignment; targets 54 are mounted onto each of wheels 22L, 22R, 24L, and 24R; the alignment apparatus 300 forms a detected image of each target 54; and the detected images are processed in computer 60, which calculates the orientation of each of the targets. The computer 60 may also store values corresponding to the position of each detected image.

Typically, the spindle position is also located. In this operation, the computer 60 acquires images of the targets 54. The vehicle 20 is rolled back, and the computer 60 acquires a second set of images of the targets 54. The computer 60 computes the angle through which the vehicle was rolled back, and based on such calculation, determines the spindle location. Optionally, the vehicle 20 can be rolled forward and measured again as a check. The computer 60 may then calculate the actual orientation of the primary planes of each of wheels 22L, 22R, 24L, and 24R. A primary plane or claw plane is an imaginary plane at an outer face of the wheel with a generally vertical orientation that is parallel to the tread of the tire that is part of the wheel.

The results of the computations described above are displayed on the display unit 72. The computer 60 may also have the display unit 72 show instructions to the alignment technician as to what corrections may need to be made to correct any detected misalignment of wheels 22L, 22R, 24L, and 24R of the vehicle 20.

The computer 60 also calculates the roll radius 17 and the roll axis 19 of each wheel 22L, 22R according to known methods, such as those disclosed in U.S. Pat. No. 6,237,234, which is incorporated herein by reference. The roll radius 17 value is then used to determine the location of the ground plane 16 (minus corrections for tire flex). The steering axis 14 can be determined using an inclinometer, as is known in the art, or using the aligner, and the centerline 18 of the wheel 22 can be determine using an electronic wheel width caliper. Alternatively, some alignment properties, such as the roll radius 17, may be measured manually by the alignment technician using a measurement tape or the equivalent to determine the distance between the center of the wheel and the point on the outer edge of the wheel directly beneath the center of the wheel. This roll radius 17 measurement may then be input to the alignment apparatus 300. The alignment apparatus 300 may perform other required measurements, and further perform calculations and/or comparisons of the results and display the results of such measurements, calculations, and comparisons.

Once the scrub radius 10 is determined, the alignment apparatus 300 presents resulting values on the display unit 72 for evaluation. The alignment technician can then use such results to help diagnose the condition of the vehicle, the vehicle suspension, and the wheels. In addition, the alignment apparatus 300 is preferably programmed to compare the resulting values for each wheel. For example, the alignment apparatus 300 can compare the measured scrub radius 10 and the manufacturer's specified scrub radius. Further, individual scrub radius 10 measurements may be compared to a predetermined value, a predetermined range of values, or manufacturing specifications, and the alignment apparatus 300 can highlight any that fall outside those specified tolerances, such as by generating a warning message to alert the alignment technician. A warning to investigate wheel pull problems might be provided if the scrub radiuses of the front wheels do not match. A wide variety of potential comparisons of the scrub radius 10 measurements may be made in addition to those listed herein.

As a result of observing the results on the display unit 72, the alignment technician is better able to determine if there is a problem significant enough to cause excessive or uneven wear of the tires or degraded performance of the vehicle, such as decreased handling or stability. Furthermore, the alignment apparatus 300 is preferably programmed to determine a new toe for the wheel 22 based upon the difference between the measured scrub radius 10 and the specified scrub radius, and indicate the new toe value to the technician so that the toe can be adjusted.

DETERMINING THE ROLL RADIUS

Figure 6:
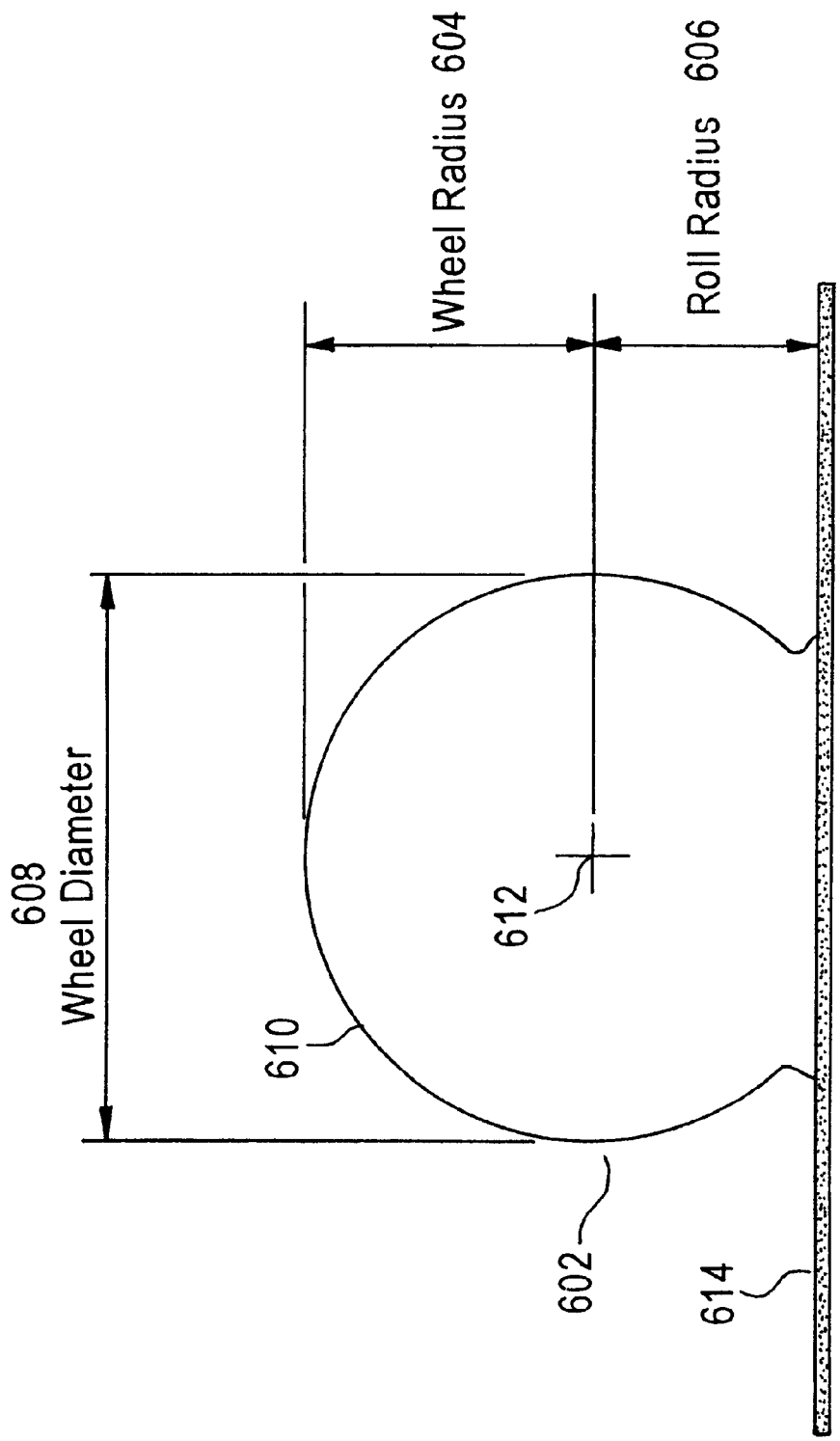
FIG. 6 is a diagram of a vehicle wheel with a wheel radius and roll radius.

FIG. 6 is a diagram of a vehicle wheel 602 that has a wheel radius 604 and roll radius 606. Wheel 602 generally has a constant wheel diameter 608 and is depicted in FIG. 6 at rest on a surface 614. The radius of the wheel 602 is defined as distance between a wheel center 612 and a wheel surface 610. The radius varies depending on which point on the wheel surface 610 is selected for the measurement. For example, if the radius is measured from wheel center 612 to the top surface of wheel 602, the result is wheel radius 604, which is equal to half of the wheel diameter 608. However, due to the weight of the vehicle, the tire deflects and flattens out against the surface 614 that wheel 602 either sits on or rolls on. Also, if the air pressure of the tire of wheel 602 is below the manufacturer specifications, the wheel 602 has a strong tendency to flatten out against surface 614 forming a large flat spot or contact area. Therefore, a measurement of the radius of wheel 602 from wheel center 612 to the bottom surface of the wheel 602, which is in contact with surface 614, yields a roll radius 606 that is less than wheel radius 604.

The difference between roll radius 606 and wheel radius 604 may adversely affect the alignment being done on the vehicle, thereby impacting the performance of the vehicle. Also, a comparison of the roll radius measurements of the wheels of a vehicle may provide the alignment technician with indications of wheel mismatch, uneven wear, low tire pressure, or unequal suspension loading.

Because roll radius 606 is less than wheel radius 604, the distance traveled over the surface 614 as wheel 602 rotates is more for a given distance than if wheel 602 is properly inflated. Wheel 602 acts as if it is a smaller circular wheel having a radius equal to roll radius 606. Roll radius 606 may be measured by rolling wheel 602 a short distance. Specifically, by determining the distance that the wheel has rolled and the angle through which the wheel has turned, roll radius 606 may be determined.

Figure 7A:
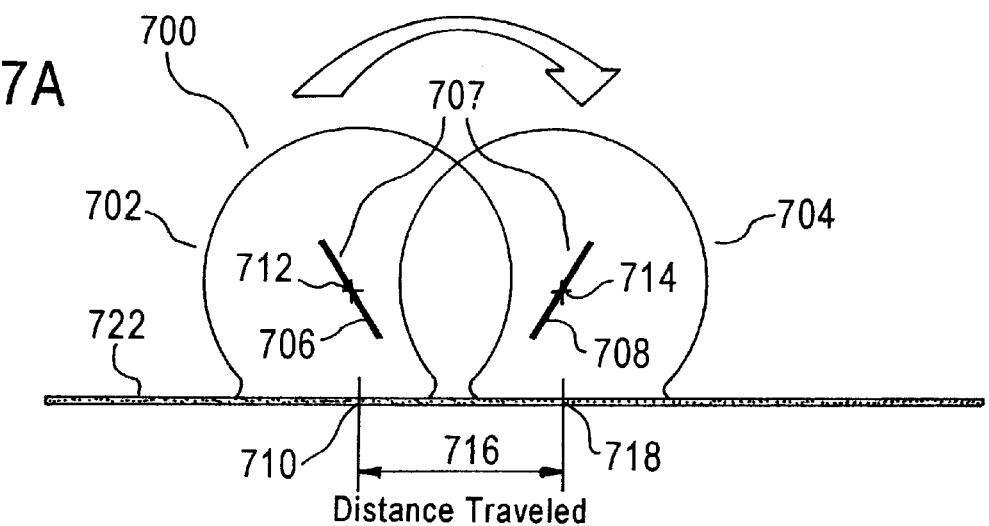
FIG. 7A is a diagram showing the change in position of a vehicle wheel as it is rolled a short distance from an initial position to a final position.

FIG. 7A is a diagram of the change in position of a vehicle wheel 700 as it is rolled a short distance from an initial position 702 on the left to a final position 704 on the right. The following description also applies to rolling a wheel from right to left.

Initial position 702 is characterized by an initial contact point 710 that is between the surface of the vehicle wheel 700 at initial position 702 and a surface 722 upon which the wheel 700 sits or rolls. Initial contact point 710 is directly below an initial position 712 of the wheel center. A target 707 may be attached to the wheel. Target 707 has initial orientation 706. Target 707 is a square element that is optically scannable or detectable by a machine vision system or equivalent apparatus.

In the example shown in FIG. 7A, final position 704 is characterized by a final contact point 718 that is between the surface of the wheel at the final position 704 and surface 722. Final contact point 718 is directly below a final position 714 of the wheel center. Target 707 has final orientation 708.

Comparison of initial contact point 710 and final contact point 718 yields a measurement of a "distance traveled" 716 by wheel 700 as it is rolled. The distance traveled 716 is sometimes also referred to as the "distance traversed" or the "traversed distance." A typical distance traveled may be 6 inches to 3 feet.

Figure 7B:
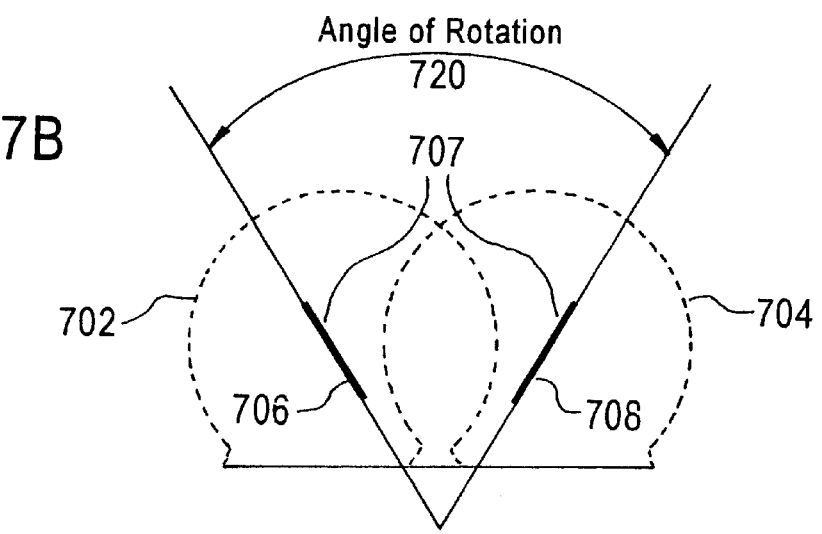
FIG. 7B is a diagram illustrating an angle of rotation through which a vehicle wheel rolls in moving from initial position to final position.

FIG. 7B is a diagram of an angle of rotation 720 through which a vehicle wheel rolls in moving from initial position 702 to final position 704. Comparison of initial orientation 706 of target 707 to final orientation 308 yields a measurement of the angle of rotation 720. The angle of rotation 720 is sometimes also referred to as the "angle of roll" or the "roll angle." An automatic machine vision system, under control of appropriate software, may be used to obtain position information for target 707, as described further below.

By using values representing the distance traveled 716 and the angle of rotation 720, the roll radius of the wheel may be measured.

The circumference of a circle is determined by the relationship:

$$C = 2\pi R \qquad (1)$$

where C is the circumference of a circle, R is the circle's radius, and $\pi$ is the geometric constant pi.

If a circle is rotated through a given angle, the ratio of that angle in degrees, $\upsilon$, to a full rotation of 360 degrees is the same as the ratio of the partial circumference, P, that the circle rolled to the circle's full circumference, C. This relationship may be stated as follows:

$$\frac{\partial}{360} = \frac{P}{C} \qquad (2)$$

Solving this expression for the circumference, C, yields:

$$C = \frac{360(P)}{\partial}$$

To find the circle's radius, R, the expression for the circumference, C, from Equation 3 is substituted into Equation 1 and solved for R. This yields the following relationship for the circle's radius:

$$R = \frac{360(P)}{2\pi\partial} \qquad (4)$$

A similar expression may be written with other units for the angle of rotation. For example, if the angle of rotation were measured in radians, the constant "360" in Equation 4 would be replaced by "$2\pi$."

Applying this relationship to a wheel that is rolled as illustrated in FIG. 7A, the partial circumference, P, is the distance traveled 716. The angle, $\upsilon$, is the angle of rotation 720. The radius, R, is roll radius 606 as shown in FIG. 6. Therefore, given the distance traveled 716 and the angle of rotation 720, roll radius 606 of wheel 602 may be measured. Values for the distance traveled 716 and the angle of rotation 720 may be determined using a wheel alignment system, such as described further herein.

COMPUTER-AIDED THREE-DIMENSIONAL MOTOR VEHICLE WHEEL ALIGNMENT SYSTEM

Figure 8:
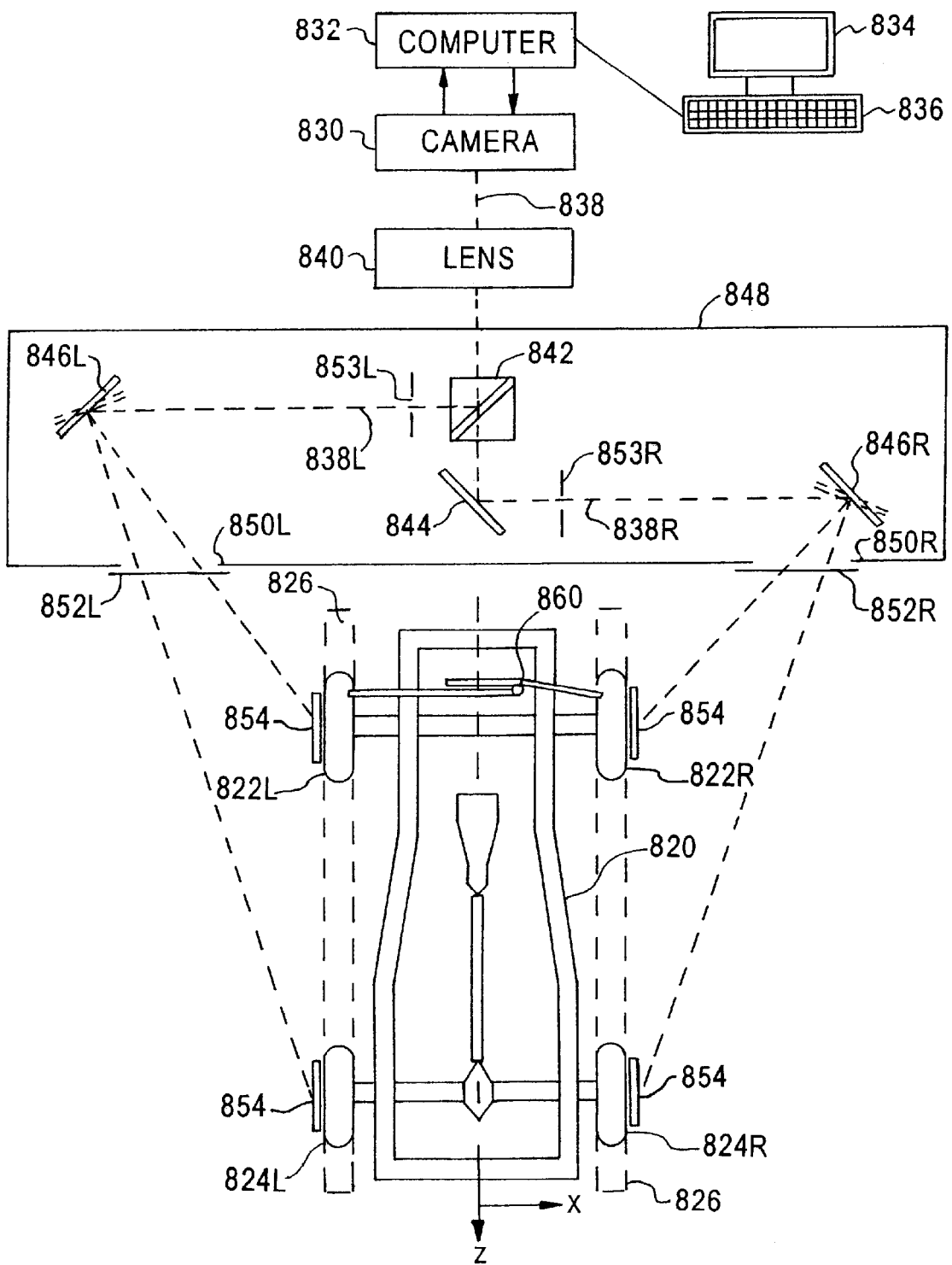
FIG. 8 is a schematic representation of an exemplary computer-aided, three-dimensional (3D) motor vehicle wheel alignment system.

FIG. 8 is a schematic representation of an exemplary computer-aided, three-dimensional (3D) motor vehicle wheel alignment system ("3D aligner" or "aligner"). While FIG. 8 depicts a single camera alignment system, other machine vision systems may be used, including those that have more than one camera.

In FIG. 8, a vehicle 820 is represented by a schematic illustration of a chassis of the vehicle and includes two front wheels 822L and 822R and two rear wheels 824L and 824R. The vehicle 820 is positioned on a conventional wheel alignment test bed or alignment rack 826, indicated by broken lines. Targets 854 are mounted on each wheel.

A video camera 830 is coupled to an electronic processing means such as a computer 832, data processor, or other equivalent device, that can be programmed to process information. Computer 832 can also display results such as on a visual display unit 834. An input device such as a keyboard 836 may be used for inputting data and other relevant information into computer 832. A computer-generated quasi-three-dimensional (3D) representation of the wheels being aligned may be depicted on display unit 834 along with indicia of the detected alignment. In addition, display unit 834 may depict hints or suggestions to guide the alignment technician who is performing the wheel alignment. Computer 832, display unit 834, and keyboard 836 represent a simplified representation of the type of computer hardware upon with an illustrative system may be implemented.

The video camera 830 sights onto the wheels 822L, 822R, 824L and 824R along a view path 838 that passes through a lens 840 and onto a beam splitter 842. Beam splitter 842 splits view path 838 into two components, 838L and 838R, respectively. As shown in FIG. 8, the left hand component 838L of view path 838 is reflected perpendicularly to the initial view path by beam splitter 842. Similarly, right hand component 838R is reflected perpendicularly to the initial view path by a prism or mirror 844 mounted adjacent to beam splitter 842. The apparatus also includes a housing 848 into which beam splitter 842, mirror 844, and at least two pan-and-tilt mirrors, 846L and 846R, are mounted. From this point onward the respective components of the apparatus and the view path are identical for both the left and right side of the motor vehicle, and therefore a description of only one side will suffice.

Targets 854, which are optically scannable, are attached to each of the wheels 822L and 824L. Left-hand component 838L of view path 838L is reflected onto targets 854 by left side pan-and-tilt mirror 846L. Left side pan-and-tilt mirror 846L is movable to allow video camera 830 to consecutively view front wheel 822L and rear wheel 824L of vehicle 820. Alternatively left side pan-and-tilt mirror 846L may be configured to view both front and rear wheels 822L and 824L simultaneously.

In a single camera alignment system, view path 838L passes from pan-and-tilt mirror 846L through an aperture 850L in the wall of housing 848 and onto the respective wheels 822L and 824L. A shutter 852L is positioned so that it may be operated to close aperture 850L thereby effectively blocking view path 838L and allowing video camera 830 to sight onto the right hand side of vehicle 820 only. Alternatively, shutters may be placed at locations 853L and 853R and/or an electronic shutter within video camera 830 may be synchronized with one or more strobed light sources to permit capture of an image only when a particular target or targets are illuminated.

A wheel alignment system works generally as follows: vehicle 820 is positioned on alignment rack 826, which is raised to allow the alignment technician to perform the alignment. Targets 854 are mounted onto each of wheels 822L, 822R, 824L, and 824R. The alignment apparatus forms a detected image of each target 854. These detected images are processed in computer 832, which calculates the orientation of each of the targets to the respective view paths 838L and 838R. Computer 832 may also store values corresponding to the position of each detected image.

Typically, the spindle position is also located. In this operation, the Computer 832 acquires images of the targets. The vehicle is rolled back, and the computer acquires a second set of images of the targets. The computer computes the angle through which the vehicle was rolled back, and based on such calculation, determines the spindle location. Optically, the vehicle can be rolled forward and remeasured as a check.

Furthermore, Computer 832 makes the necessary corrections to calculate the true orientation of the wheels relative to the respective view paths and to allow for the orientation of pan-and-tilt mirrors 846L and 846R. Computer 832 may then calculate the actual orientation of the primary planes of each of wheels 822L, 822R, 824L, and 824R. A "primary plane" is an imaginary plane with a generally vertical orientation that is parallel to the tread of the tire that is part of the wheel.

The results of the computations described above are displayed on display unit 834. Computer 832 may also have display unit 834 show instructions to the alignment technician as to what corrections may need to be made to correct any detected misalignment of wheels 822L, 822R, 824L, and 824R of vehicle 820.

MEASUREMENTS OF DISTANCE TRAVELED AND ANGLE OF ROTATION

An alignment system of the type shown in FIG. 8 is used to measure the distance traveled 716 and the angle of rotation 720 of each wheel 822L, 822R, 824L, and 824R as vehicle 820 is rolled from initial position 702 to final position 704.

Vehicle 820 is initially positioned on alignment rack 826 and targets 854 are attached to each wheel 822L, 822R, 824L, and 824R. The aligner takes images of each target 854 to determine an initial position 702 of each of the wheels 822L, 822R, 824L, and 824R. Computer 832 creates and stores values corresponding to the initial position 702 of each of the wheels 822L, 822R, 824L, and 824R.

Vehicle 820 is rolled from initial position 702 to final position 704. Once vehicle 820 has been rolled, the aligner takes images of each target 854 to determine a final position 704 of each of the wheels 822L, 822R, 824L, and 824R. Computer 832 creates and stores values corresponding to the final position 704 of each of the wheels 822L, 822R, 824L, and 824R. The aligner may also prompt a technician to roll the vehicle and take position measurements by appropriate instructions or signals generated by computer 832.

The aligner processes the images of initial position 702 and final position 704 of each wheel 822L, 822R, 824L, and 824R to determine both the distance traveled 716 and the angle of rotation 720 of each wheel 822L, 822R, 824L, and 824R. Under control of software or electronics, values for the distance traveled 716 and the angle of rotation 720 are created and stored. Based on these two measurements, the aligner calculates the roll radius 606 of each wheel 822L, 822R, 824L, and 824R according to Equation 4 above. A roll radius value is created and stored. The aligner then presents resulting values on display unit 834 for evaluation. The alignment technician can then use such results to help diagnose the condition of the vehicle and the wheels, including whether the wheels are properly matched, if there is excessive wear on any of the wheels, whether the wheels are properly inflated, and if there is unequal suspension loading.

In moving vehicle 820 from initial position 702 to final position 304, vehicle 820 is rolled a sufficient distance to provide for accurate measurements of the distance traveled 316 and the angle of rotation 720 of each of wheels 822L, 822R, 824L, and 824R. However, there are limits on how far vehicle 820 may be moved due to practical considerations such as keeping the vehicle on alignment rack 826. The minimum angle of rotation 320 through which vehicle 820 must be rolled is about 10 degrees. Furthermore, moving the vehicle such that the angle of rotation 320 is about 30 degrees provides accurate measurements while keeping vehicle 820 on alignment rack 826.

ALTERNATIVE METHOD FOR MEASUREMENT OF THE DISTANCE TRAVELED

Figure 9:
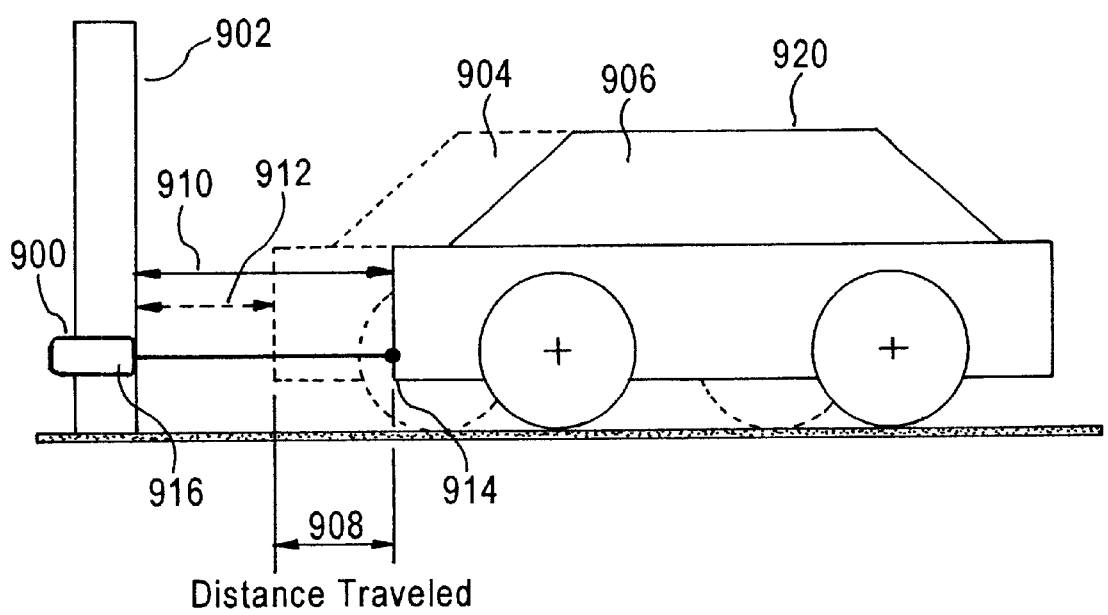
FIG. 9 shows an example in which a vehicle is rolled away from a wall from an initial position to a final position.

Alternatively, the distance traveled when moving the vehicle may be measured without reference to angles. FIG. 9 shows an example in which vehicle 920 is rolled away from wall 902 from an initial position 904 to a final position 906. In FIG. 9, there is a linear transducer 900 having an element 914 that is attached to a fixed point on the vehicle and having a body 916 secured to a stationary point on the alignment rack, the floor, or a wall 902. The distance traveled 908 is determined by the change in indications of the linear transducer as element 914 moves from an initial position 910 to a final position 912.

Alternatively, the distance traveled 908 may be measured manually by the alignment technician using a laser range finder, a measurement tape or the equivalent. The resulting measurement of the distance traveled is then input to an alignment system, such as the aligner described above. Such an aligner can also perform other functions, such as measuring the angle of rotation, performing calculations, comparing such results and displaying the results for the alignment technician to evaluate.

MEASUREMENT OF THE ANGLE OF ROTATION

Optionally, the angle of rotation may be measured electrically by mounting a gravity gauge to a wheel, such that the gravity gauge is parallel to the wheel plane. The wheel plane is an imaginary plane that is generally oriented vertically and parallel to the treads on the tire of the wheel. Therefore, a gravity gauge mounted parallel to the wheel plane is rotated through the same angle of rotation as the wheel itself when the wheel is rolled. If an angular measurement from the gravity gauge is taken at the initial position of the wheel and also at the final position of the wheel, the difference between those two angular measurements yields the angle of rotation.

Figure 10A:
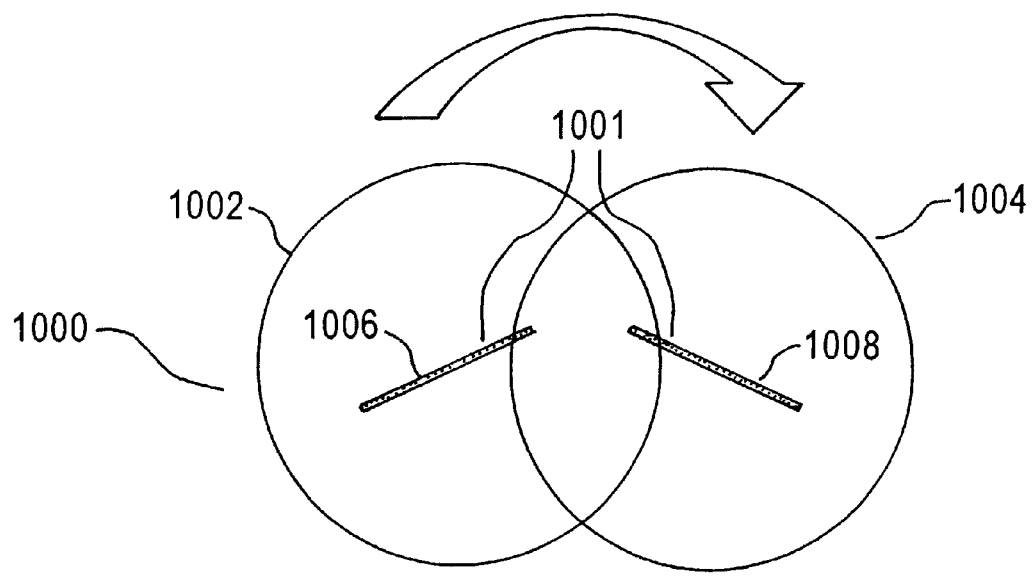
FIG. 10A depicts measuring the angle of rotation by mounting a gravity gauge to a wheel.
Figure 10B:
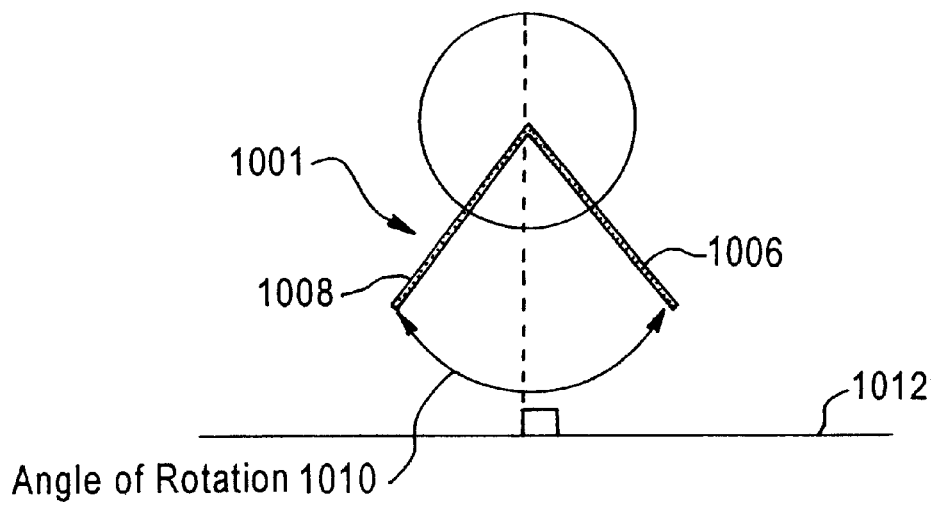
FIG. 10B is a simplified diagram of a gravity gauge in an initial position and final position.

FIG. 10A illustrates this method. A wheel 1000 has an initial position 1002. A gravity gauge 1001 is also shown in an initial position 1006. When wheel 1000 is rolled into a final position 1004, gravity gauge 1001 is in a final position 1008. FIG. 10B is a simplified diagram of gravity gauge 1001 in initial position 1006 and final position 1008. As shown, the angle of rotation 1010 is the difference between initial position 1006 and final position 1008 of gravity gauge 1001. At rest, gauge 1001 is normal to plane 1012.

Gravity gauges that may be used include those in electronic alignment heads made by Hunter Engineering Company or FMC. Typically, there are three gravity gauges in such alignment heads. A first gravity gauge in the wheel plane is called the caster gauge. A second gravity gauge is used to measure the amount that a wheel has turned to determine the run-out compensation of the wheel. Since both gauges are parallel to the plane of the wheel.

Alternatively, the angle of rotation may be measured manually by the alignment technician. The resulting measurement of the angle of rotation may then be input to an alignment system, such as the aligner discussed above. The aligner may also perform other required measurements, such as that of the distance traveled, and further perform calculations and/or comparisons of the results and display the results of such measurements, calculations, and comparisons.

MEASUREMENT OF THE ROLL RADIUS

In many alignment systems, heads or targets are attached to the wheels with clamps that are self-centering. Thus, a point on the head and clamp assembly is known to be at the center of the wheel. By measuring the distance between this center point and any point on the outer edge of the wheel, the radius of the wheel to that point on the outer edge of the wheel may be determined. If such a measurement is made to the point at the bottom of the wheel in contact with the surface upon which the wheel sits, and which is located directly beneath the center of the wheel, then the roll radius of the wheel may be measured directly.

Alternatively, a ride height measurement device may be used to measure the roll radius. A ride height measurement device is conventionally used for measuring the distance between the center of the wheel and the top of the wheel well for ride height measurements. For example, a ride height measurement device manufactured by Hunter Engineering Company may be modified mechanically to enable the device to touch the top of the wheel or to touch the test bed or alignment rack upon which the vehicle sits. The modifications could include mounting the L bar upside down and adding a longer horizontal section to enable it to touch the top of the wheel. The apparatus can be mounted upside down so that its linear measurement device moves to touch the surface that the vehicle is sitting on. This provides the alignment system with a direct measurement of the roll radius of the particular wheel.

Alternatively, the roll radius may be measured manually by the alignment technician using a measurement tape or the equivalent to determine the distance between the center of the wheel and the point on the outer edge of the wheel directly beneath the center of the wheel. This roll radius measurement may then be input to an alignment system, such as the aligner discussed above. The aligner may perform other required measurements, and further perform calculations and/or comparisons of the results and display the results of such measurements, calculations, and comparisons.

Computer Hardware

Figure 5:
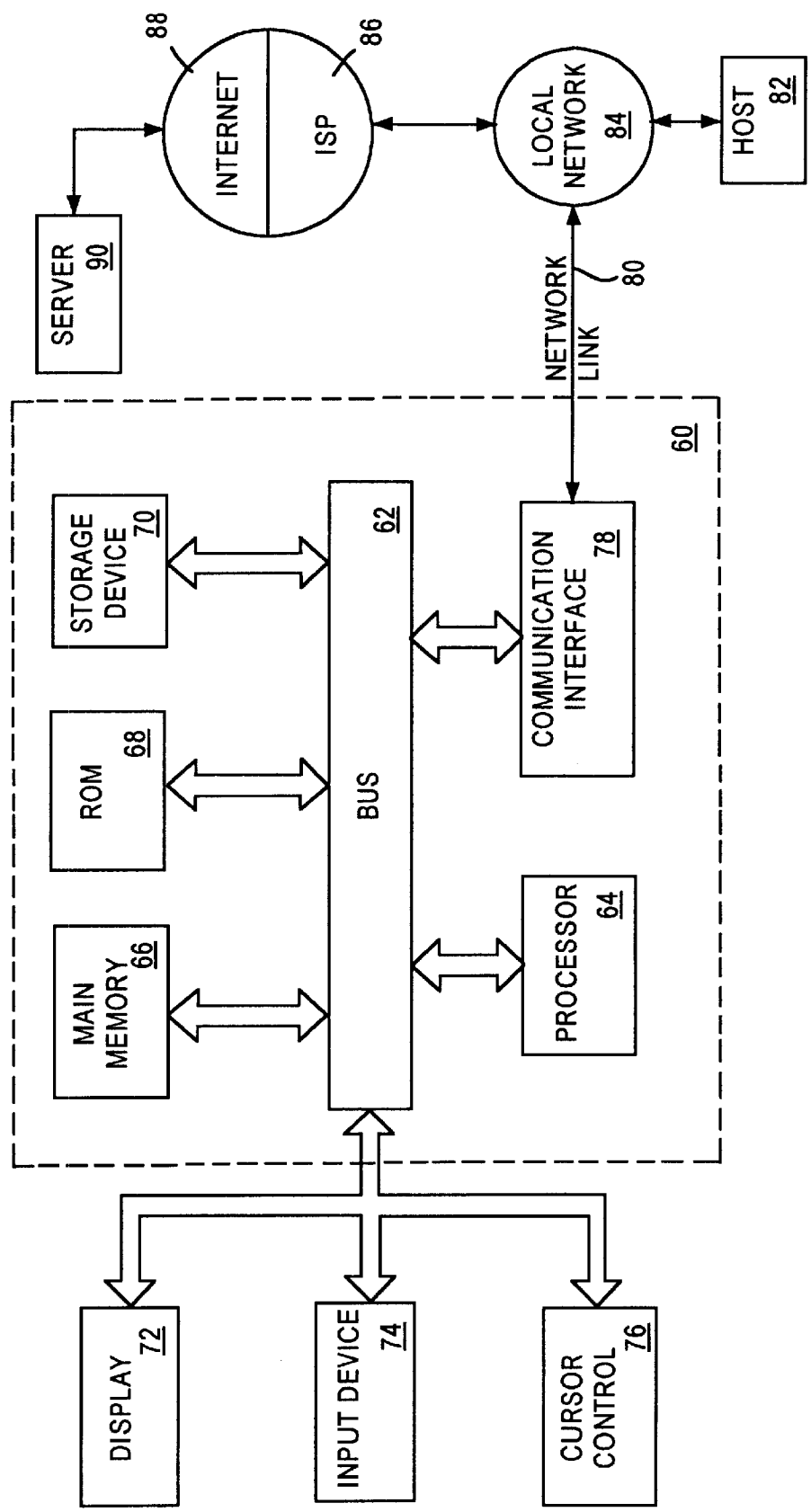
FIG. 5 is a block diagram of a computer system for use with the apparatus of FIG. 4.

FIG. 5 is a block diagram illustrating in greater detail the computer 60 for use with the alignment apparatus 300 of FIG. 4. The computer 60 includes a bus 62 or other communication mechanism for communicating information, a processor 64 coupled to the bus 62 for processing information, and a main memory 66, such as a random access memory (RAM) or other dynamic storage device, coupled to the bus 62 for storing information and instructions to be executed by the processor 64. The main memory 66 also may be used for storing temporary variables or other intermediate information during execution of instructions to be executed by the processor 64. The computer 60 also includes a read only memory (ROM) 68 or other static storage device coupled to the bus 62 for storing static information and instructions for the processor 64, and a storage device 70, such as a magnetic disk or optical disk, is provided and coupled to the bus 62 for storing information and instructions. As shown, in addition to the display 72 and the keyboard 74, the computer 60 may also include a cursor control 76, such as a mouse.

The computer 60 is used for determining the scrub radius 10 of each of the front wheels of a motor vehicle, by carrying out the methods 100 and 200 of the present disclosure. According to one aspect, the scrub radius 10 is provided by the computer 60 in response to the processor 64 executing one or more sequences of one or more instructions contained in the main memory 66. Such instructions may be read into the main memory 66 from another computer-readable medium, such as the storage device 70. Execution of the sequences of instructions contained in the main memory 66 causes the processor 64 to perform the methods provided by the present disclosure. In alternative embodiments, hard-wired circuitry may be used in place of or in combination with software instructions to implement the present disclosure. Thus, the present disclosure is not limited to any specific combination of hardware circuitry and software.

The term "computer-readable medium" as used herein refers to any medium that participates in providing instructions to the processor 64 for execution. Such a medium may take many forms, including but not limited to, non-volatile media, volatile media, and transmission media. Non-volatile media includes, for example, optical or magnetic disks, such as storage device 70. Volatile media includes dynamic memory, such as the main memory 66. Transmission media includes coaxial cables, copper wire and fiber optics, including the wires that comprise bus 62. Transmission media can also take the form of acoustic or light waves, such as those generated during radio-wave and inn-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 64 for execution. For example, the instructions may initially be carried on a magnetic disk of a remote computer. The remote computer can load the instructions into its dynamic memory and send the instructions over a telephone line using a modem. A modem local to computer 60 can receive the data on the telephone line and use an inn-red transmitter to convert the data to an inn-red signal. An inn-red detector can receive the data carried in the inn-red signal and appropriate circuitry can place the data on bus 62. Bus 62 carries the data to main memory 66, from which processor 64 retrieves and executes the instructions. The instructions received by main memory 66 may optionally be stored on storage device 70 either before or after execution by processor 64.

The computer 60 also includes a communication interface 78 coupled to bus 62. The communication interface 78 provides a two-way data communication coupling to a network link 80 that is connected to a local network 82. For example, the communication interface 78 may be an integrated services digital network (ISDN) card or a modem to provide a data communication connection to a corresponding type of telephone line. As another example, the communication interface 78 may be a local area network (LAN) card to provide a data communication connection to a compatible LAN. Wireless links may also be implemented. In any such implementation, communication interface 78 sends and receives electrical, electromagnetic or optical signals that carry digital data streams representing various types of information.

The network link 80 typically provides data communication through one or more networks to other data devices. For example, the network link 80 may provide a connection through local network 82 to a host computer 84 or to data equipment operated by an Internet Service Provider (ISP) 86. The ISP 86 in turn provides data communication services through the world wide packet data communication network now commonly referred to as the "Internet" 88. Local network 82 and Internet 88 both use electrical, electromagnetic or optical signals that carry digital data streams. The signals through the various networks and the signals on network link 80 and through communication interface 78, which carry the digital data to and from computer 60, are exemplary forms of carrier waves transporting the information.

The computer 60 can send messages and receive data, including program code, through the network(s), network link 80 and communication interface 78. In the Internet example, a server 90 might transmit a requested code for an application program through Internet 88, ISP 86, local network 82 and communication interface 78. In accordance with the present disclosure, one such downloaded application provides for determining the scrub radius 10 of the wheels of a motor vehicle as previously described.

The received code may be executed by the processor 64 as it is received, and/or stored in the storage device 70, or other non-volatile storage for later execution. In this manner, the computer 60 may obtain application code in the form of a carrier wave.

Thus, the present disclosure provides a method 100 and an apparatus 300 for determining a scrub radius 10 of a vehicle wheel 22. The specific methods and apparatus described in this specification have been presented by way of illustration rather than limitation, and various modifications, combinations and substitutions may be effected by those skilled in the art without departure either in spirit or scope from this disclosure in its broader aspects and as set forth in the appended claims. All methods and apparatus disclosed herein, and all elements thereof, are contained within the scope of at least one of the following claims. No elements of the presently disclosed methods and apparatus are meant to be disclaimed.

What is claimed is:

1. A method of measuring a scrub radius of a wheel, comprising:
   using a computer-aided alignment apparatus to determine at least one of a steering axis, a centerline and a ground plane of the wheel;
   determining the other of the steering axis, the centerline and the ground plane of the wheel not determined using a computer-aided alignment apparatus;
   determining an intersection between the steering axis and the ground plane of the wheel;
   determining an intersection between the centerline and the ground plane of the wheel; and
   determining a distance between the intersections, the distance comprising the scrub radius of the wheel.

2. A method according to claim 1, wherein the steering axis, the centerline, and the ground plane of the wheel are determined using the computer-aided alignment apparatus.

3. A method according to claim 1, wherein at least one of the steering axis, the centerline, and the ground plane of the wheel are determined using means other than the computer-aided alignment apparatus and the determined values are provided to the computer-aided alignment apparatus.

4. A method according to claim 1, wherein the intersection between the steering axis and the ground plane, the intersection between the centerline and the ground plane, and the distance between the intersections are determined using a computer-aided alignment apparatus.

5. A method according to claim 1, further comprising determining a roll axis and a roll radius of the wheel and determining the ground plane based on the roll axis and the roll radius.

6. A method according to claim 1, further comprising determining a thickness and a claw plane of the wheel and determining the centerline based on the thickness and the claw plane.

7. A method according to claim 1, wherein the computer-aided alignment apparatus comprises a computer-aided, three-dimensional machine vision apparatus including optical scanning devices and optically scannable targets, and the method also includes:

attaching an optically scannable target to the wheel;

optically scanning the target when the wheel is in a first position, and creating and storing values representing the first position; and optically scanning the target when the wheel is in a second position, and creating and storing values representing the second position.

8. A method according to claim 5, further comprising:

rolling the wheel between the first and the second positions; and determining the roll radius of the wheel based on the stored position values.

9. A method according to claim 5, further comprising:

steering the wheel between the first and the second positions; and determining the steering axis of the wheel based on the stored position values.

10. A method according to claim 1, further comprising:

comparing the determined scrub radius to a specified scrub radius; and generating a warning if the determined scrub radius is not about equal to the specified scrub radius.

11. A method according to claim 1, further comprising:

comparing the determined scrub radius to a specified scrub radius; and calculating a new toe for the wheel if the determined scrub radius is not about equal to the specified scrub radius.

12. An apparatus for measuring a scrub radius of a wheel comprising:

a target fixedly attachable to the wheel;

a vision imager for detecting a first image of the target when the wheel is in a first position and for detecting a second image of the target when the wheel is in a second position; and a data processor programmed to determine a scrub radius of the wheel based at least in part upon a comparison of the first image and the second image of the target.

13. An apparatus according to claim 12, wherein the vision imaging apparatus detects the first image of the target by optically scanning the target when the wheel is in the first position, and detects the second image of the target by optically scanning the target when the wheel is in the second position.

14. An apparatus according to claim 12, wherein the data processor is programmed to create and store values representing the first position of the wheel based upon the first image of the target, and create and store values representing the second position of the wheel based upon the second image of the target.

15. An apparatus according to claim 12, wherein the data processor is programmed to:

determine an intersection between a steering axis of the wheel and a ground plane of the wheel;

determine an intersection between a centerline of the wheel and the ground plane of the wheel; and determine a distance between the intersections, the distance comprising the scrub radius of the wheel.

16. An apparatus according to claim 12, wherein the data processor is programmed to determine a roll axis and a roll radius of the wheel and to determine the ground plane based on the roll axis and the roll radius.

17. An apparatus according to claim 12, wherein as the wheel is rolled between the first and the second positions, the programmed data processor determines the roll radius of the wheel based upon the comparison of the first image and the second image of the target.

18. An apparatus according to claim 12, wherein as the wheel is steered between the first and the second positions, the programmed data processor determines the steering axis of the wheel based upon the comparison of the first image and the second image of the target.

19. An apparatus according to claim 12, wherein the data processor is programmed to compare the determined scrub radius to a specified scrub radius, and generate a warning if the determined scrub radius is not about equal to the specified scrub radius.

20. An apparatus according to claim 12, wherein the data processor is programmed to compare the determined scrub radius to a specified scrub radius, and calculate a new toe for the wheel if the determined scrub radius is not about equal to the specified scrub radius.

21. A computer-readable medium carrying one or more sequences of instructions which, when executed by one or more processors, causes the one or more processors to:

detect a first image of a target fixed to a wheel in a first position;

detect a second image of the target when the wheel is in a second position; and determine a scrub radius of the wheel based at least in part upon a comparison of the first image and the second image of the target.

22. A computer-readable medium according to claim 21, wherein the instructions cause the data processor to detect the first image of the target by optically scanning the target when the wheel is in the first position, and detect the second image of the target by optically scanning the target when the wheel is in the second position.

23. A computer-readable medium according to claim 21, wherein the instructions cause the data processor to create and store values representing the first position of the wheel based upon the first image of the target, and create and store values representing the second position of the wheel based upon the second image of the target.

24. A computer-readable medium according to claim 21, wherein the instructions cause the data processor to:

determine an intersection between a steering axis of the wheel and a ground plane of the wheel;

determine an intersection between a centerline of the wheel and the ground plane of the wheel; and determine a distance between the intersections, the distance comprising the scrub radius of the wheel.

25. A computer-readable medium according to claim 21, wherein the instructions cause the data processor to determine a roll axis and a roll radius of the wheel and determine the ground plane based on the roll axis and the roll radius.

26. A computer-readable medium according to claim 21, wherein when the wheel is rolled between the first and the second positions, the instructions cause the data processor to determine the roll radius of the wheel based upon the comparison of the first image and the second image of the target.

27. A computer-readable medium according to claim 21, wherein when the wheel is steered between the first and the second positions, the instructions cause the data processor to determine the steering axis of the wheel based upon the comparison of the first image and the second image of the target.

28. A computer-readable medium according to claim 21, wherein the instructions cause the data processor to compare the determined scrub radius to a specified scrub radius, and generate a warning if the determined scrub radius is not about equal to the specified scrub radius.

29. A computer-readable medium according to claim 21, wherein the instructions cause the data processor to compare the determined scrub radius to a specified scrub radius, and calculate a new toe for the wheel if the determined scrub radius is not about equal to the scrub radius.

* * * * *